Dec. 14, 1965   R. L. HASTINGS   3,223,429
FOLDABLE UTILITY CART

Filed Nov. 20, 1962   4 Sheets-Sheet 1

INVENTOR.
ROBERT L. HASTINGS

Dec. 14, 1965  R. L. HASTINGS  3,223,429
FOLDABLE UTILITY CART
Filed Nov. 20, 1962  4 Sheets-Sheet 2

INVENTOR.
ROBERT L. HASTINGS
BY
ATTORNEYS

Dec. 14, 1965 R. L. HASTINGS 3,223,429
FOLDABLE UTILITY CART
Filed Nov. 20, 1962 4 Sheets-Sheet 3

INVENTOR.
ROBERT L. HASTINGS
BY *Hobbs & Caxton*
ATTORNEYS

Dec. 14, 1965  R. L. HASTINGS  3,223,429
FOLDABLE UTILITY CART
Filed Nov. 20, 1962  4 Sheets-Sheet 4

INVENTOR.
ROBERT L. HASTINGS
BY Hobbs & Easton
ATTORNEYS

United States Patent Office 3,223,429
Patented Dec. 14, 1965

3,223,429
FOLDABLE UTILITY CART
Robert L. Hastings, 1108 4th St., La Porte, Ind.
Filed Nov. 20, 1962, Ser. No. 239,004
7 Claims. (Cl. 280—36)

The present invention relates to carts and more particularly to a foldable utility cart.

In the use of conventional delivery trucks and similar vehicles, cartons, boxes and other packages are loaded on the vehicle, transported to the customer and then carried by hand from the vehicle into the customer's establishment, or, as an alternative, are placed on a separate hand operated cart or dolly and wheeled into the establishment and then unloaded therefrom. In this latter operation, the cart or dolly is usually carried unloaded on the transporting vehicle, and itself first unloaded from the vehicle and then loaded with the packages to be delivered to the customer. This multiple handling of the items is not only inconvenient and time consuming, but may result in damage to the packages from excess handling, and is particularly unsuited for making deliveries of partial packages or items from a number of different packages to a number of different customers or to a number of different stations, concessions or locations, requiring reloading the cart on the vehicle and moving the vehicle from one location to another and repeating the cart loading and unloading operation at each new location. The multiple handling operation of a number of items is frequently involved in supplying one or more vending machines at a number of different locations, the number of different items being relatively large and the number of each item often being relatively small so that the large packages or containers for each item will be used to service a number of different machines at the various locations. It is therefore one of the primary objects of the present invention to provide a cart which can conveniently hold the packages containing the various items and which can be easily loaded bodily onto the transporting vehicle without first unloading the cart and without any danger of spilling the contents from the opened packages or cartons.

Another object of the present invention is to provide a utility cart for carrying cartons, boxes and other packages from a transporting vehicle, such as a delivery truck or station wagon, into a customer's establishment, the bed of which is at a convenient height for reaching the items in the various packages during the loading and unloading operations, and which will readily and effectively fold into a compact position for transportation on the vehicle with the bed of the cart remaining in the same position as when the cart is in its unfolded position.

Still another object of the invention is to provide a foldable cart of the aforementioned type which will automatically fold into a compact position with the floor of the bed remaining in horizontal position and the packages thereon in an upright position as the cart is pushed onto the bed of the transporting vehicle, and which is so constructed and arranged that it will firmly and effectively hold the packages in their upright position while the vehicle is being moved from one location to another.

A further object is to provide a foldable cart having a pair of relatively large retractable wheels for transporting the cart and a retractable leg for holding the cart in an upright position while articles are being loaded on and removed from the cart, and being provided with a pair of spaced rigid legs for retaining the bed of the cart in its horizontal position when the cart is in its folded position.

Another object of the invention is to provide a utility container for use in conjunction with carts of the aforementioned types, which can be mounted on the cart in an easily reached position, and which can be locked when not in use to prevent unauthorized removal of objects, such as money, therefrom.

Additional objects and advantages of the invention will become apparent from the following description and accompanying drawings, wherein.

Figure 1:
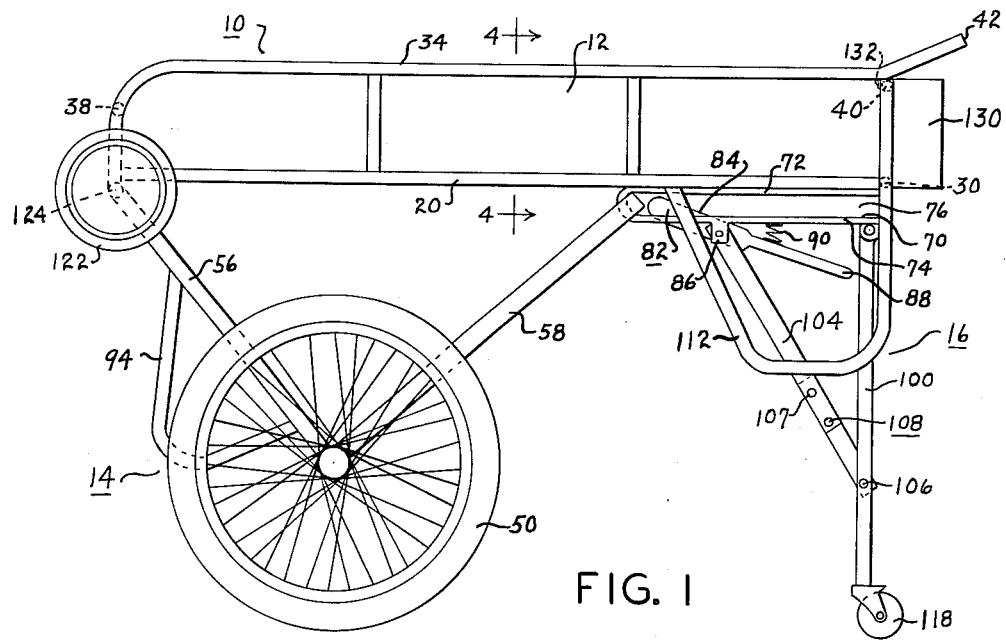
FIGURE 1 is a side elevational view of the present utility cart showing the cart in its unfolded position ready to transport cartons, boxes and other types of packages from a delivery truck to a customer's establishment or vending machine.
Figure 3:
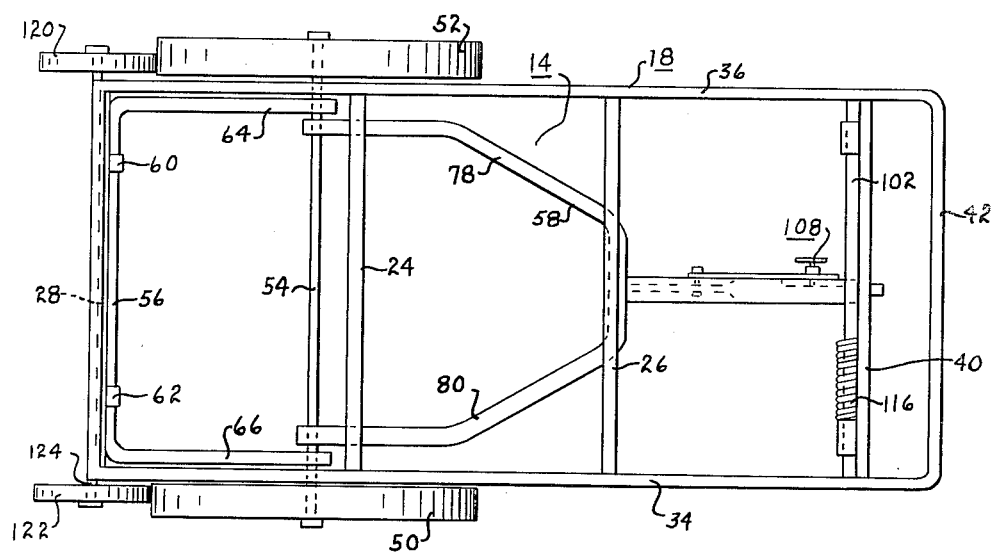
FIGURE 3 is a top plan view of the utility cart shown in FIGURE 1 with the flat solid bed thereof removed in order to better show the cart structure.

Referring more specifically to the drawings, numeral 10 designates generally the present utility cart having a bed 12, undercarriage 14 and a retractable support 16. The bed may be of any suitable construction adapted to the particular type of products, articles or packages to be transported thereon, the particular bed shown consisting of a rectangular frame 18 of two longitudinally arranged and laterally spaced bars 20 and 22 rigidly connected by intermediate cross members 24 and 26 and cross members 28 and 30, the cross members being welded of otherwise firmly secured to the longitudinal members 20 and 22. A flat bottom 32 of either wood, plastic or metal is placed on frame 18 and extends substantially coextensive with the four edges thereof. In the particular bed shown, the products, articles or other materials placed thereon are prevented from sliding or otherwise falling from bottom 32 by side members 34 and 36 and cross members 38 and 40, side members 34 and 36 being preferably formed as an integral unit connected by member 42 extending outwardly and upwardly from the end of the cart and forming a handle for the operator to push and maneuver the cart.

Figure 2:
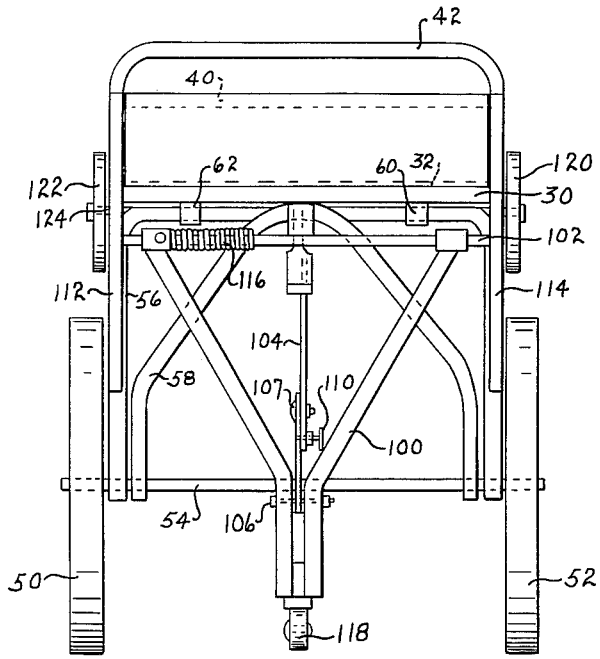
FIGURE 2 is an end elevational view of the utility cart shown in FIGURE 1.
Figure 4:
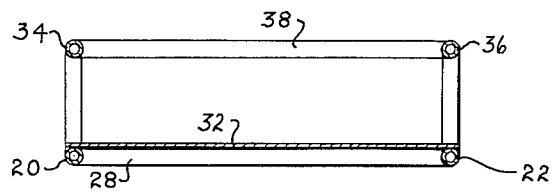
FIGURE 4 is a cross sectional view of the frame and bed of the present cart, the section being taken on line 4—4 of FIGURE 1.
Figure 5:
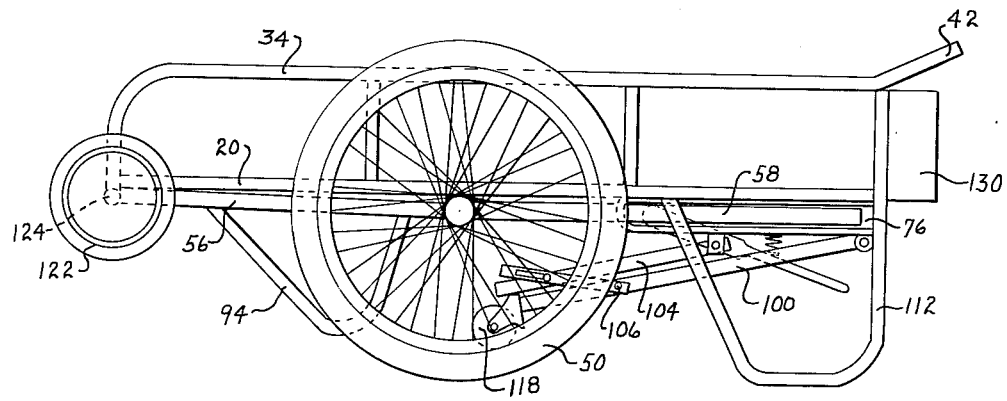
FIGURE 5 is a side elevational view of the cart shown in the preceding figures, illustrating the manner in which the cart is folded for transporting on a delivery truck or other vehicle.

The undercarriage 14 consists of two relatively large wire wheels 50 and 52 preferably having pneumatic tires thereon and mounted on the ends of axle 54 which is pivotally connected to frame 18 by an inverted U-shaped support member 56 and a modified inverted U-shaped member 58. U-shaped member 56 is pivotally connected at its upper end to end cross member 28 by U-shaped fixtures 60 and 62, and at its lower end to axle 54, the axle extending through the ends of the two downwardly extending arms 64 and 66 of U-shaped member 56. U-shaped support member 58 is slidably supported at its upper end in a fixture 70 consisting of two elongated members 72 and 74 joined at their two ends and forming a slot 76 in which the upper end of member 58 is adapted to slide. When member 58 is in the left-hand end of fixture 70, as shown in FIGURE 1, the wheels are in their fully operative position, as illustrated in FIGURES 1 and 2, and when the member is in the opposite end, i.e. the right-hand end of slot 76, the wheels are in their fully retracted position, as illustrated in FIGURE 5. The lower end of member 58 is pivotally connected to axle 54 by the axle extending through holes in the free ends of arms 78 and 80 of member 58.

Member 58 is locked in its fully operable position, as illustrated in FIGURES 1 and 2, by a latch mechanism 82 consisting of a lever 84 pivoted on a bracket 86 attached to the lower side of fixture 70. The lever is provided with an easily accessible handle 88 and is urged in the direction to lock member 58 in the left-hand end of slot 76 by a coil spring 90 reacting between handle 88 and the underside of longitudinal member 74 of fixture 70. When the cart is to be folded, handle 88 is pressed upwardly, thus moving the opposite end of lever 84 downwardly sufficiently to permit the upper end of support member 58 to pass freely from the left-hand end of slot 76 to the right-hand end thereof, thus permitting support member 56 to pivot upwardly carrying the two wheels from the position shown in FIGURE 1 to the position shown in FIGURE 5. Support member 56 is provided with projections 94 on arms 64 and 66 which are used to assist in folding or retracting undercarriage 14, as will be more fully explained hereinafter.

Support leg 16 consists of a modified V-shaped leg 100 pivoted at its upper end on rod 102 and being braced in its operative position by a foldable lever 104, the lever being pivotally attached at its lower end to leg 100 by bolt 106 extending through the two arms of the legs, and pivotally supported at its upper end on bracket 86. Lever 104 consists of an upper and lower section pivotally connected to one another by a rivet or bolt 107 and held in their aligned or extended position by a releasable latch 108 consisting of a retractable pin and handle 110. The two ends of rod 102 are supported on downwardly extending U-shaped legs 112 and 114, the rod being welded or otherwise rigidly joined to the two legs. When leg 100 is to be retracted, i.e. moved from the position shown in FIGURE 1 to the position shown in FIGURE 5, the pin 110 is operated to release the two sections of lever 104 and permit the lever to bend forwardly, thereby causing the leg 100 to pivot inwardly and upwardly on rod 102. This leg may be held in that position when the cart is being pushed or maneuvered. In order to facilitate lifting of the leg when the latch 108 is released, a coil spring 116 on and anchored to rod 102 and connected to the upper end of the leg, rotates the leg inwardly and upwardly. The lower end of the leg preferably is provided with a roller or caster 118 to permit eaesy maneuvering of the cart after the unloading and loading locations have been reached.

In order to facilitate loading and unloading the present cart on a delivery truck or in a station wagon or the like, a pair of wheels 120 and 122 are provided at the end of bed 12 opposite handle 42. The two wheels are mounted on a transversely disposed shaft 124 extending through a downward extension of side members 34 and 36.

Figure 6:
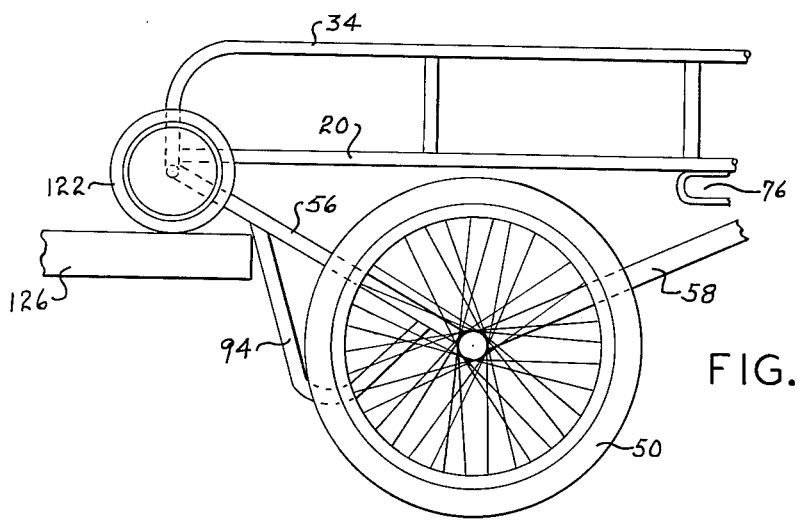
FIGURE 6 is a fragmentary side elevational view of the present cart illustrating the manner in which it is folded and unfolded.
Figure 10:
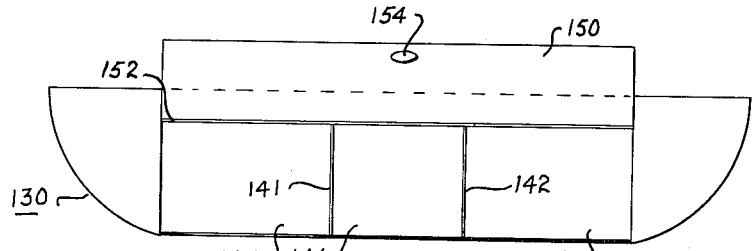
FIGURES 9 and 10 are top plan views of the container shown in FIGURE 7, the former showing the container in closed position and the latter showing the container in opened position.
Figure 9:
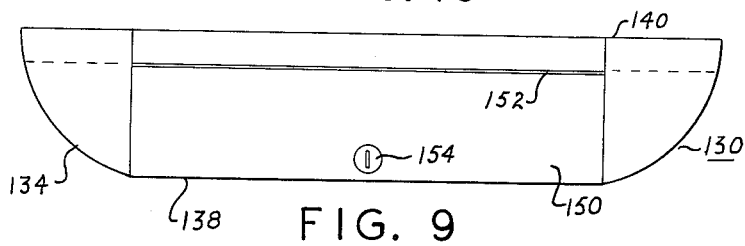
Figure 7:
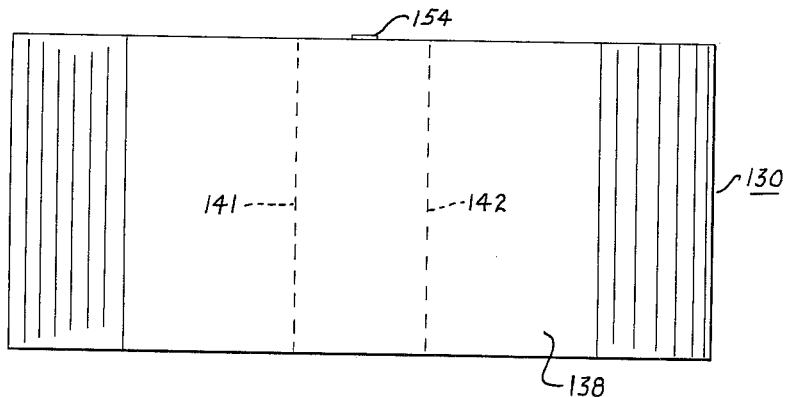
FIGURE 7 is an elevational view of a utility container for use in conjunction with the present cart.
Figure 8:
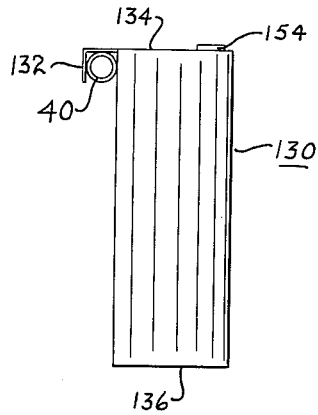
FIGURE 8 is an end elevational view of the container shown in FIGURE 7.

In the operation of the present utility cart with the cart in its unfolded position, as illustrated in FIGURE 1, cartons, boxes or other packages are loaded on bed 12 and leg support 16 is retracted by releasing lever 104. The cart is then moved to the desired location and the leg support is again moved to its vertical position, thereby giving the cart stability while the cart is being unloaded. When the cart is returned to the truck, it may be easily loaded thereon by first retracting leg support 16 in the manner described and rolling wheels 120 and 122 onto the vehicle bed 126 and pushing the extension members 94 against the vehicle at the edge of the bed, as shown in FIGURE 6. As the pushing continues, after lever 82 has been released, further pushing of the extensions 94 against the bed causes the wheels 50 and 52 to retract, moving member 58 from the left-hand end of slot 76 to the right-hand end thereof and permitting the wheels to move from the position shown in FIGURE 1 to the position shown in FIGURE 5. With the wheels fully retracted in this manner, U-shaped legs 112 and 114 support the bed in its horizontal position and the articles thereon in their upright position. When the wheels are fully retracted, the lower sides thereof are on a plane with the lower edge of U-shaped legs 112 and 114, thereby not only holding the bed in its level position, but giving substantial stability to the cart while it is being transported, and preventing artcles, packages and the like from sliding or otherwise falling from the bed.

Since the present cart is designed to efficiently service vending machines and the like, it is desirable to have a place for service tools, money and the like. A container 130, shown in detail in FIGURES 7 through 10, is mounted on the end if bed 12 adjacent handle 42 and is supported thereon by a U-shaped bracket 132 extending over cross member 40. This container is preferably constructed of metal such as aluminum and consists of top 134, bottom 136 and side walls 138 and 140 with partitions 141 and 142 forming compartments 144, 146 and 148 open at the top and closed by a door 150 pivoted on a hinge 152 along one side thereof. A lock 154 is preferably included on the door to prevent unauthorized removal of articles or the like therefrom.

While only one embodiment of the present invention has been described in detail herein, various changes and modifications may be made without departing from the scope of the invention.

I claim:

1. A foldable delivery cart, comprising a frame having two longitudinal side members and two end members connected to said side members, a foldable undercarriage including an axle extending transversely of said frame, a wheel on each end of said axle, a first inverted U-shaped support member pivoted at its upper end to said frame at one end thereof and connected at its lower end to said axle, a second inverted U-shaped support member connected at its lower end to said axle, a bracket means secured to the underside thereof adjacent the end opposite said first mentioned support member and having an elongated slot therein extending lengthwise of the frame and slidably holding the upper end of said second support member, a latch means for retaining said second support member in the end of said slot nearest said first support member and thereby retaining said undercarriage in its unfolded position, a leg pivoted to said frame at the end thereof opposite said first support member, a spring for urging said leg to a position adjacent the underside of said frame, a releasable bracket for retaining said leg in its upstanding position, a roller on the lower end of said leg, a pair of rigid legs at each side of said frame near the same end as said leg, said rigid legs extending downwardly from the frame to the same extent as said wheels when said undercarriage is in its folded position, a pair of spaced wheels connected to said frame at the same end as said first support member, a handle connected to said frame at the same end as said legs, and an elongated transversely arranged container mounted on said frame adjacent said handle and having a plurality of compartments and a hinged cover therefor, said container being secured to said frame when said cart is in either its folded or unfolded position without interfering with the folding and unfolding operation.

2. A foldable delivery cart, comprising a frame having two longitudinal side members and two end members connected to said side members, a foldable undercarriage including an axle extending transversely of said frame, a wheel on each end of said axle, a first inverted U-shaped support member pivoted at its upper end to said frame at one end thereof and connected at its lower end to said axle, extension means on said support member extending toward the adjacent end of said frame, a second inverted U-shaped support member connected at its lower end to said axle, a bracket means secured to the underside thereof adjacent the end opposite said first mentioned support member and having an elongated slot therein extending lengthwise of the frame and slidably holding the upper end of said second support member, a latch means for retaining said second support member in the end of said slot nearest said first support member and thereby retaining said undercarriage in its unfolded position, a leg pivoted to said frame at the end thereof opposite said first support member, a spring for urging said leg to a position adjacent the underside of said frame, a releasable bracket for retaining said leg in its upstanding position, a pair of rigid legs at each side of said frame near the same end as said leg, said rigid legs extending downwardly from the frame to the same extent as said wheels when said undercarriage is in its folded position, and a pair of spaced wheels connected to said frame at the same end as said first support member.

3. A foldable utility cart, comprising a frame, a foldable undercarriage including an axle extending transversely of said frame, a wheel on each end of said axle, a first support member pivoted at its upper end to said frame at one end thereof and connected at its lower end to said axle, extension means on said support member extending toward the adjacent end of said frame, a second support member connected at its lower end to said axle, a bracket means secured to the underside thereof adjacent the end opposite said first mentioned support member and having an elongated slot therein extending lengthwise of the frame and slidably holding the upper end of said second support member, a latch means for retaining said second support member in the end of said slot nearest said first support member and thereby retaining said undercarriage in its unfolded position, a leg pivoted to said frame at the end thereof opposite said first support member, a releasable bracket for retaining said leg in its upstanding position, and a pair of rigid legs at each side of said frame near the same end as said leg, said rigid legs extending downwardly from the frame to the same extent as said wheels when said undercarriage is in its folded position.

4. A foldable utility cart, comprising a frame, a foldable undercarriage including an axle extending transversely of said frame, a wheel on each end of said axle, a first support member pivoted at its upper end to said frame at one end thereof and connected at its lower end to said axle, a second support member connected at its lower end to said axle, a bracket means secured to the underside thereof adjacent the end opposite said first mentioned support member and having an elongated slot therein extending lengthwise of the frame and slidably holding the upper end of said second support member, a latch means for retaining said second support member in the end of said slot nearest said first support member and thereby retaining said undercarriage in its unfolded position, a leg pivoted to said frame at the end thereof opposite said first support member, and a second leg on said frame near the same end as said first mentioned leg.

5. A foldable utility cart, comprising a frame, a foldable undercarriage including an axle extending transversely of said frame, a wheel on each end of said axle, a first support member pivoted at its upper end to said frame at one end thereof and connected at its lower end to said axle, a second support member connected at its lower end to said axle, a bracket means secured to the underside thereof adjacent the end opposite said first mentioned support member and slidably holding the upper end of said second support member, a leg pivoted to said frame at the end thereof opposite said first support member, a second leg on said frame near the same end as said first mentioned leg, said second leg extending downwardly from the frame to the same extent as said wheels when said undercarriage is in its folded position, a pair of spaced wheels connected to said frame at the same end as said first support member, and a handle connected to said frame at the same end as said legs.

6. A foldable utility cart, comprising a frame, a foldable undercarriage including an axle extending transversely of said frame, a wheel on each end of said axle, a first support member pivoted at its upper end to said frame at one end thereof and connected at its lower end to said axle, a second support member connected at its lower end to said axle, a bracket means secured to the underside thereof adjacent the end opposite said first mentioned support member and slidably holding the upper end of said second support member, a leg pivoted to said frame at the end thereof opposite said first support member, and a second leg on said frame near the same end as said first mentioned leg.

7. In a foldable utility cart: a frame, a foldable undercarriage including an axle extending transversely of said frame, a wheel on each end of said axle, a first support member pivoted at its upper end to said frame at one end thereof and connected at its lower end to said axle, extension means on said support member extending toward the adjacent end of said frame, a second support member connected at its lower end to said axle, a bracket means secured to the underside of said frame adjacent the end opposite said first mentioned support member and having an elongated slot therein extending lengthwise of the frame and slidably holding the upper end of said second support member, and a latch means for retaining said second support member in the end of said slot nearest said first support member and thereby retaining said undercarriage in its unfolded position.

References Cited by the Examiner
UNITED STATES PATENTS

| | | | |
|---|---|---|---|
| 1,875,107 | 8/1932 | Mueller | 224—42.46 |
| 2,582,435 | 1/1952 | Howard | 280—47.35 |
| 2,673,671 | 3/1954 | Williams | 224—42.46 |
| 2,841,438 | 7/1958 | Weil | 280—41 X |
| 2,877,047 | 3/1959 | Weil | 280—41 X |
| 2,877,048 | 3/1959 | Weil | 296—20 |
| 2,958,873 | 11/1960 | Fernan | 296—20 X |
| 2,992,833 | 7/1961 | Holdinghans et al. | 280—47.35 X |
| 3,079,167 | 2/1963 | Russell | 280—41 |
| 3,082,016 | 3/1963 | Pratt | 280—36 |
| 3,088,770 | 5/1963 | Weil et al. | 296—20 |

FOREIGN PATENTS 646,685  11/1950  Great Britain.

ARTHUR L. LA POINT, *Primary Examiner.*

PHILIP ARNOLD, *Examiner.*